Sept. 17, 1963
H. J. DE LONG
3,103,696
CHILLING SHACKLE
Filed April 4, 1960
3 Sheets-Sheet 3
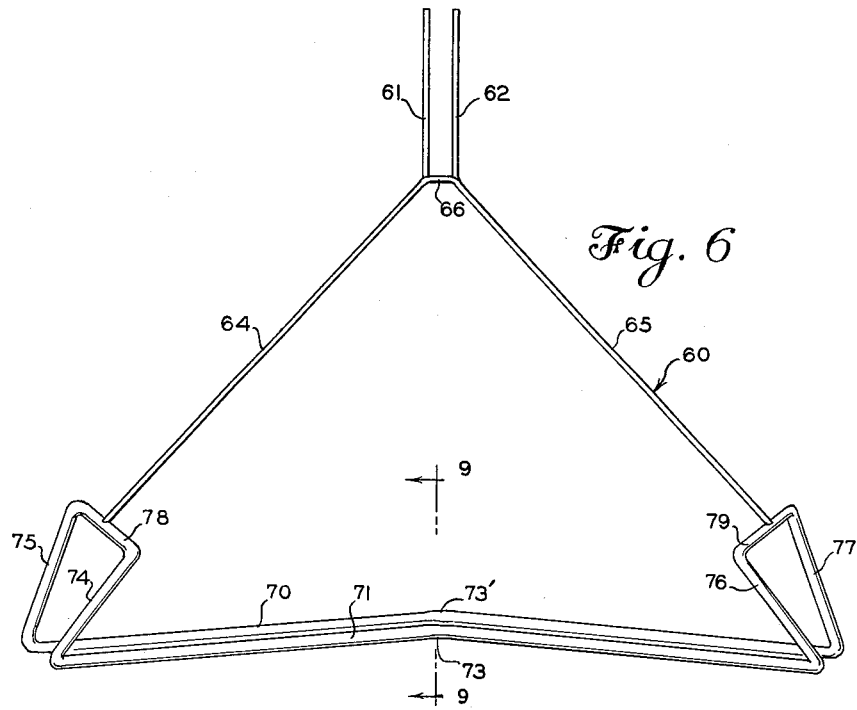
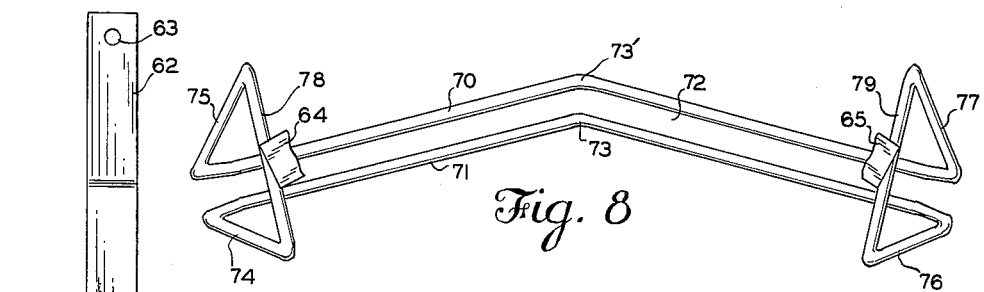
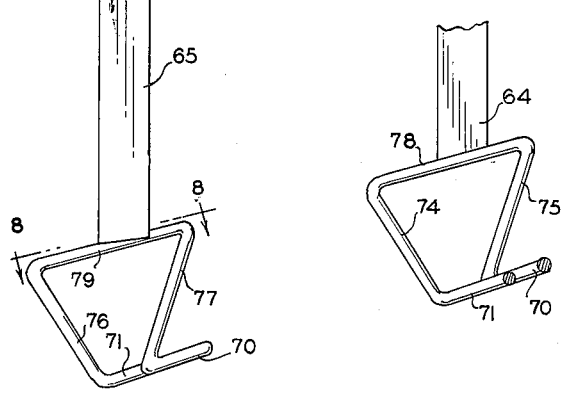
INVENTOR.
HORACE J. DELONG
BY:
ATTORNEY

United States Patent Office 3,103,696
Patented Sept. 17, 1963

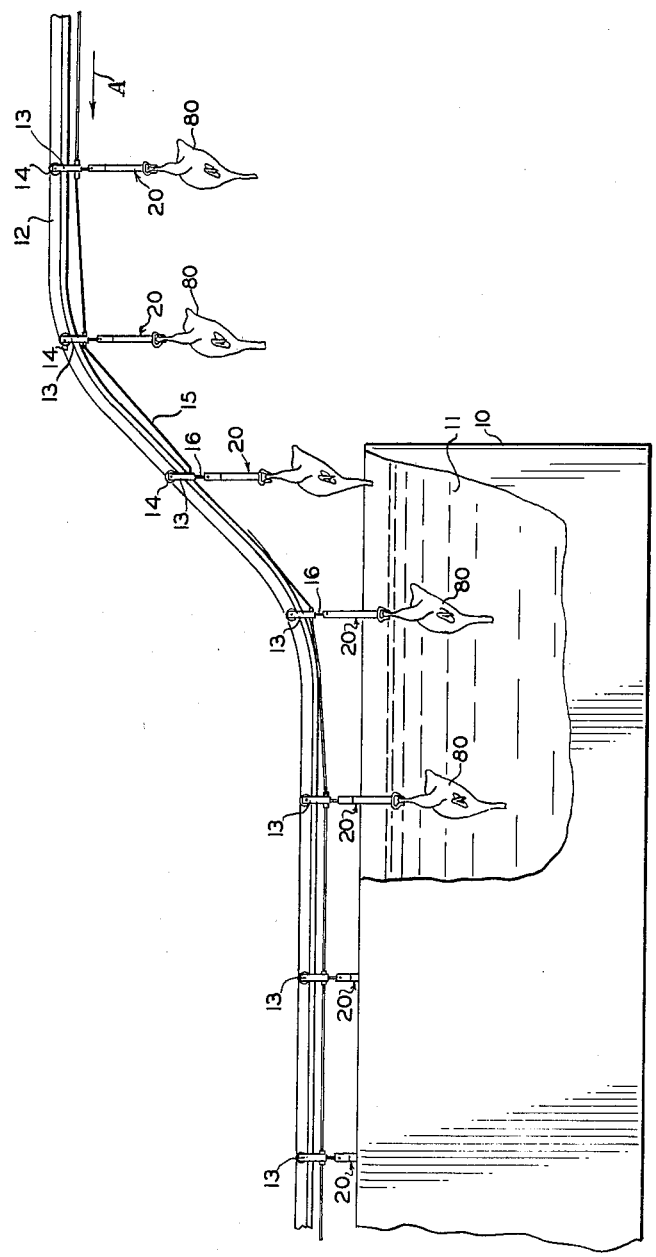

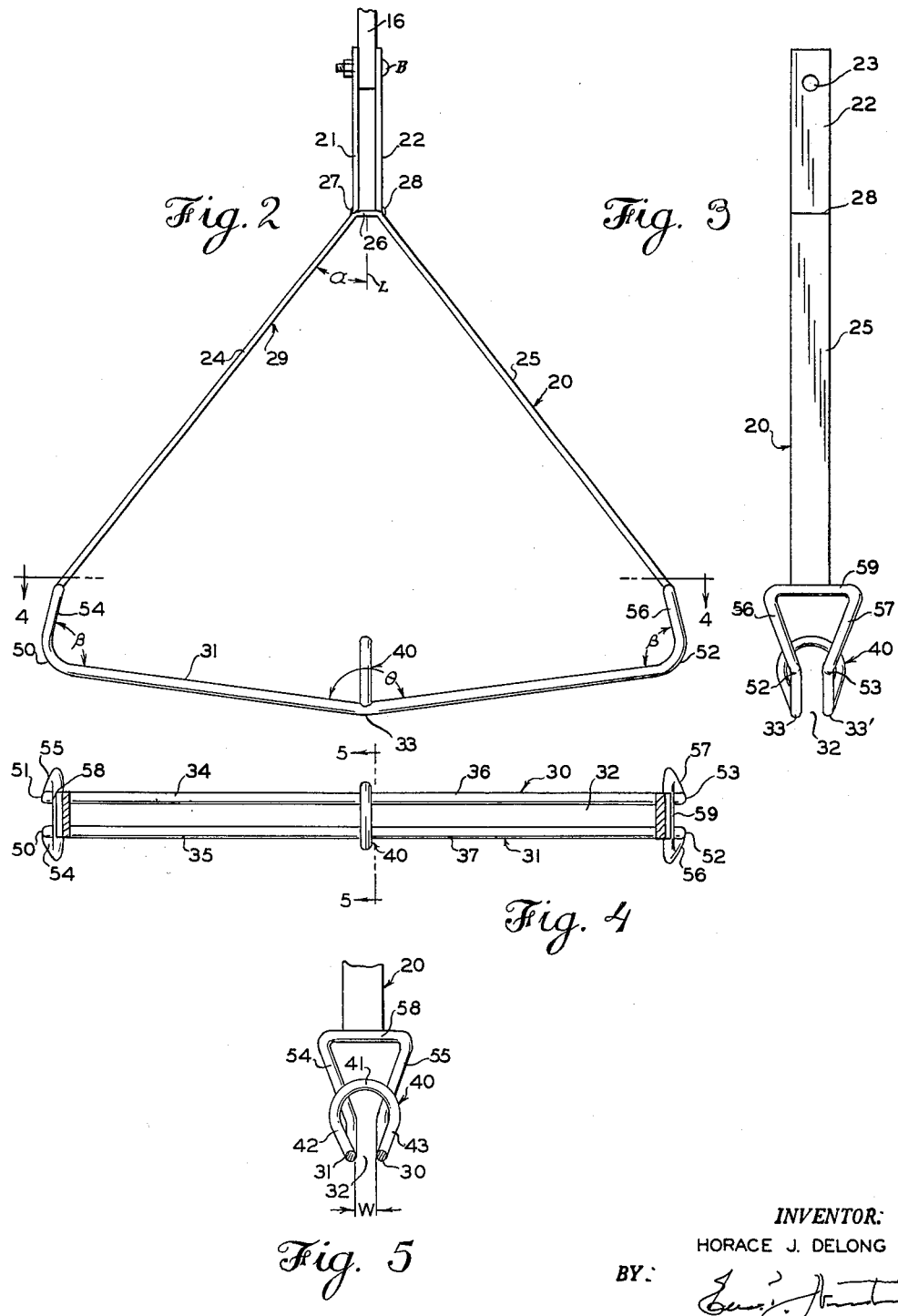

3,103,696
CHILLING SHACKLE
Horace J. De Long, Gainesville, Ga., assignor to Gainesville Machine Co., Inc., Gainesville, Ga., a corporation of Georgia
Filed Apr. 4, 1960, Ser. No. 19,630
11 Claims. (Cl. 17—44.1)

This invention relates to poultry shackles, and is more particularly concerned with a chilling shackle which will carry a plurality of fowls being suspended by their knee joints through a chilling bath, subsequent to the defeathering and eviscerating processes.

In the usual poultry processing plant, when the fowl is to be processed, it is placed in an inverted position on a poultry shackle carried by a mono-rail, the fowl being suspended by its feet from the shackle. During this operation the neck of the fowl is cut so that the blood will drain from the body as the fowl is being transported to a heated vat. In the heated vat, the feathers are wet sufficiently so that in a subsequent operation the feathers may be removed from the fowl as the fowl is still suspended and transported on the shackle. Next, the fowl is usually eviscerated, washed and removed from the shackle usually by the severing of the knee joints, the legs of the fowl being retained on the shackle and thereafter removed therefrom. In a subsequent operation, the fowl must be chilled before it is packaged for shipment to the market.

The present invention relates specifically to the chilling operation wherein the fowl is moved through cold water in order to reduce the body temperature of the fowl to below say about 40° F. and thereby retard spoilage, as required by the Department of Agriculture regulations.

Briefly, the present invention includes a shackle having a pair of spaced poultry suspending bars, essentially parallel to each other throughout their length. The bars are joined together at their ends by cross straps which do not interfere with the installation of poultry on the bars. The straps, in turn, are connected to a supporting frame by which the bars may be carried in a horizontal plane. In use, several fowls, such as chickens, are installed on a single shackle which is carried by a mono-rail and the fowls may be dislodged by moving the same to one side or the other.

Accordingly, it is an object of the present invention to provide a chilling shackle which is simple and inexpensive to manufacture, durable in structure and efficient in operation.

A further object of the present invention is to provide a chilling shackle wherein a plurality of fowls may be installed on a single shackle.

Another object of the present invention is to provide a chilling shackle on which a plurality of fowls may be easily and quickly installed or discharged from either side thereof.

Other objects, features and advantages of the present invention will become apparent from the following description when taken in conjunction with the accompanying drawings wherein like characters of reference designate corresponding parts throughout the several views and wherein:

FIG. 1 is a side elevational view of a portion of the poultry processing machinery including a mono-rail and a chilling tank, the mono-rail supporting a plurality of chilling shackles produced in accordance with the present invention, each shackle thereof supporting a plurality of poultry.

FIG. 2 is a front elevational view of the chilling shackle produced in accordance with the present invention.

FIG. 3 is a side elevational view of the chilling shackle shown in FIG. 2.

FIG. 4 is a cross sectional view taken along line 4—4 in FIG. 2.

FIG. 5 is a cross sectional view taken along line 5—5 in FIG. 4.

FIG. 6 is a front elevational view of a modified form of chilling shackle produced in accordance with the present invention.

FIG. 7 is a side elevational view of the poultry shackle shown in FIG. 6.

FIG. 8 is a cross sectional view taken along line 8—8 in FIG. 7.

FIG. 9 is a cross sectional view taken along line 9—9 in FIG. 6.

Referring now in detail to the embodiments chosen for the purpose of illustrating the present invention, it being understood that the invention, in its broader aspects, is not limited to the exact details herein depicted in the drawings, numeral 10 denotes a chilling tank containing water 11 for chilling the poultry. A mono-rail 12 is adapted to carry a plurality of shackle carrying members 13 having trolley wheels 14 by which the shackle carrying members 13 are suspended from the mono-rail and to move therealong. The shackle carrying members 13 are in spaced relationship to each other and are connected together by cable 15 whereby simultaneous movement of all shackle carrying members 13 is accomplished. The mono-rail 12 is so arranged that when the shackle carrying members 13 are moved in the direction of the arrow A in FIG. 1 the shackle carrying members 13 will be successively moved in a horizontal path immediately above the upper surface of the water 11 along the length of the tank 10 and then moved upwardly therefrom. Suspended from each shackle carrying member 13 a metal rod 16 having at its lower end an eyelet which receives a bolt B for securing the shackle in place.

The apparatus heretofore described is conventional in most poultry processing plants and hence those skilled in the art will understand the construction and operation of the chilling tank and mono-rail arrangement.

According to the present invention, the chilling shackle includes a supporting frame, denoted generally by numeral 20. Frame 20 has a pair of parallel downwardly extending spaced body straps 21 and 22, provided at their upper ends with holes, such as hole 23, through which the bolt of rod 16 passes to pivotally secure the frame to rod 16. Secured to the body straps 21 and 22 is a carrying strap 29. The carrying strap 29 is a flat metal bar bent to form an inverted V-shaped member and includes a pair of downwardly diverging arms 24 and 25 connected together by its flattened apex providing a connector bar 26. In more detail, the connector bar 26 is secured to the ends of the parallel straps 21 and 22 by welding 27 and 28 whereby the straps 21 and 22 are held in their spaced parallel relationship to straddle the rod 16. By such an arrangement, the diverging arms 24 and 25 extend at acute angle α with respect to the vertical center line L from the ends of body straps 21 and 22 downwardly and outwardly from each other. The arms 24 and 25 lie in the same vertical plane with the parallel body straps 21 and 22.

The poultry suspending member is carried by the ends of the diverging arms 24 and 25 and is formed preferably of circular metal wire bent into a particular configuration. In more detail, the poultry suspending member includes forward and rearward, spaced parallel poultry suspending bars denoted generally by numerals 30 and 31. Bars 30 and 31 are in spaced relationship parallel to each other to provide a poultry receiving space 32 therebetween.

In the embodiment shown in FIGS. 2, 3, 4 and 5, the poultry suspending bars 30 and 31 are bent downwardly to form an obtuse angle θ at their central portions indicated by numerals 33, 33' to provide pairs of upwardly and outwardly extending arms, the left hand pair of arms being denoted by numerals 34 and 35 and the right hand pair of arms being denoted by numerals 36 and 37. The apex at the portions 33, 33' of each of bars 30 and 31 is joined together by a horseshoe-shaped brace denoted by numeral 40. The horseshoe-shaped brace 40 includes an arcuate central portion 41 which is essentially semi-circular, the construction being such that the inside diameter of the arcuate central portion 41 is greater than the space 32 between the suspending bars 30 and 31. Integrally formed with the central portion 41 and extending downwardly therefrom are a pair of downwardly converging arms 43 and 42, the lower ends of which connect respectively to the central portions 33, 33' of the suspending bars 30 and 31. It will be understood by those skilled in the art that spot welding or the like may be employed in securing the lower ends of the arms 42 and 43 to the suspending bars 31 and 30.

The outer ends of the suspending bars 30 and 31 are bent upwardly and inwardly to acute angles β so that the end portions 50, 51, 52 and 53 form the outer extremities of the shackle. The legs 54, 55, 56 and 57 extend from end portions 50, 51, 52 and 53 respectively and diverge upwardly from each other, leg 54 diverging upwardly and outwardly from leg 55 and leg 56 diverging upwardly and outwardly from leg 57. The upper ends of the legs 54 and 55 are joined by a cross strap 58 and the upper ends of legs 56 and 57 are joined by a similar cross strap 59, the cross straps 58 and 59 being connected at their central portions to the lower ends of the diverging arms 24 and 25 and extending forwardly and rearwardly therebeyond.

When the apparatus is viewed from one end, as in FIG. 3, it will be seen that the space 32 is arranged along the center line of the supporting frame 20 and that the space above the space 32 and defined by the diverging legs 54, 55 and 56, 57 is greater than the space 32. Preferably the space 32 has a width W of approximately 9/16 inch since this width is less than the width of the knee joint of a fowl and greater than the thickness of the leg structure immediately above the knee joint of the fowl.

Referring now to FIGS. 6, 7, 8 and 9, the modified form of the present invention includes a supporting frame 60 having a pair of parallel body straps 61 and 62 and the diverging arms 64 and 65 joined as in the previous embodiment by a spacer bar 66. Connected to the lower ends of the arms 64 and 65 is the fowl suspending member which includes a continuous circular wire having the fowl suspending bars 70 and 71. These suspending bars 70 and 71 extend parallel to each other to provide a poultry receiving space 72 therebetween and are offset rearwardly along their central portion to provide apexes 73, 73'. The outer ends of the bars are bent to an acute angle to provide diverging legs 74, 75, 76 and 77 which are joined by cross members 78 and 79, the cross members being connected to the lower ends of the arms 64 and 65.

From the foregoing description the operation of the present invention is apparent. In the embodiment of FIGS. 2, 3, 4 and 5, after the fowls have been severed at their knee joints to release them from the previous shackles (not shown) which carried them through the process, the knee joints of the fowls are passed through the opening defined by the diverging legs 56 and 57 or 54 and 55 so that the portions of the legs of each fowl immediately below the knee joints (when the fowl is inverted) is received in the space 32. Usually approximately two or three fowls are installed through the opening defined by legs 56 and 57 and a similar number are installed between the openings defined by legs 54 and 55, even though it will be understood that all fowls may be installed entirely from one side if desired because the space in brace 40 is sufficiently large that it does not obstruct the sliding of the fowls. Thus, approximately four to six fowls are arranged on the poultry supporting member. Similarly, the fowls may be installed between the members 70 and 71 of the embodiment shown in FIGS. 6–9.

With such an arrangement, the fowls 80 may be readily passed through the water 11 and thereafter be readily discharged from the chilling shackles. When the shackle travels through the chilling tank 10, the bends 50, 51, 52 and 53 and the similar construction of the alternative embodiment prevent the fowls 80 which are installed inwardly thereof on the chilling shackles from being damaged by striking the sides of the tank 10. The downwardly and inwardly directed arrangement of the bars 30 and 31 prevent the fowls from being dislodged easily during their travel, while the rearwardly directed arrangement of bars 70 and 71 of the alternative embodiment tends to urge the fowls inwardly as they are carried through water 11 when the alternative embodiments of FIGS. 6, 7, 8 and 9 is used. Further, since the bars 30 and 31 are essentially horizontal, no bending force is applied to the fowls 80 which might break the skin on the legs of the fowls 80.

It will be obvious to those skilled in the art that many changes and modifications may be made in the embodiments here presented for purpose of illustrating the present invention without departing from the scope thereof as defined by the appended claims.

I claim:

1. A chilling shackle for suspending poultry of the type to be carried suspended from a continuous conveyor comprising in combination, a pair of spaced parallel body members for attachment to said conveyor, a connector bar connected to said body members for maintaining said body members in said spaced parallel relationship, a pair of downwardly diverging arms respectively extending from the lower ends of said body members, cross members connected adjacent the ends of said arms and extending forwardly and rearwardly beyond said arms, downwardly converging legs connected to the ends of each of said cross members, and forward and rearward spaced substantially parallel poultry suspending bars extending between said legs and beneath said arms, the forward suspending bar being connected between the lower ends of the legs connected to the forward ends of said cross members, the rearward suspending bar being connected between the lower ends of the legs connected to the rearward ends of said cross members, said poultry suspending bars each extending inwardly and downwardly toward their central portions.

2. A chilling shackle for suspending poultry of the type to be carried suspended from a continuous conveyor comprising in combination, a pair of spaced parallel body members for attachment to said conveyor, a connector bar connected to said body members for maintaining said body members in said spaced parallel relationship, a pair of downwardly diverging arms respectively extending from the lower ends of said body members, cross members connected to the ends of said arms and extending forwardly and rearwardly beyond said arms, downwardly converging legs connected to the ends of each of said cross members, and forward and rearward spaced substantially parallel poultry suspending bars extending between said legs and beneath said arms, the forward suspending bar being connected between the lower ends of the legs connected to the forward ends of said cross members, the rearward suspending bar being connected between the lower ends of the legs connected to the rearward ends of said cross members, said legs and said suspending bars defining acute angles therebetween such that the junction between said legs and said bars form the outer opposite extremities of the shackle.

3. A chilling shackle for suspending poultry of the type to be carried suspended from a conveyor comprising in combination, a pair of spaced parallel body straps for attachment to said conveyor, a pair of downwardly diverging arms respectively extending from said body straps, cross straps connected to the ends of said arms, downwardly converging legs connected to said cross straps, and forward and rearward spaced essentially parallel poultry suspending bars extending between said legs and beneath said arms, the forward suspending bar being connected between the lower ends of the legs connected to the forward ends of said cross straps, the rearward suspending bar being connected between the lower ends of the legs connected to the rearward ends of said cross straps, said legs and said suspending bars defining acute angles therebetween such that the junction between said legs and said bars form the outer opposite extremities of the shackle, said poultry suspending bars each extending inwardly and downwardly toward their central portions.

4. A chilling shackle for suspending poultry of the type to be carried on a carrying member suspended from a mono-rail by a bolt passing horizontally through the carrying member comprising in combination, a pair of spaced vertically disposed parallel body straps provided with apertures through which said bolt extends, a pair of downwardly diverging arms respectively extending from the lower ends of said body straps, downwardly converging legs connected to the ends of each of said diverging arms, and forward and rearward spaced essentially parallel poultry suspending bars extending between said legs and beneath said arms, the forward suspending bar being connected between the lower ends of the legs connected to the forward portion of said arms, the rearward suspending bar being connected between the lower ends of the legs connected to the rearward portion of said arms, said legs and said suspending bars defining acute angles therebetween such that the junction between said legs and said bars form the outer opposite extremities of the shackle.

5. A chilling shackle for suspending poultry of the type to be carried on a carrying member suspended from a mono-rail by a bolt passing horizontally through the carrying member comprising in combination, a pair of spaced vertically disposed parallel body straps provided with apertures through which said bolt extends, a pair of downwardly diverging arms extending from the lower ends of said body straps, and forward and rearward spaced essentially parallel poultry suspending bars extending between said legs and beneath said arms, the space between said suspending bars being sufficiently narrow that the knee of the poultry to be suspended therefrom will not pass therebetween and sufficiently wide that the portion immediately above the knee of the poultry to be suspended thereon may be received between said bars.

6. A chilling shackle for suspending poultry of the type to be carried on a carrying member suspended from a mono-rail by a bolt passing horizontally through the carrying member comprising in combination, a pair of spaced vertically disposed parallel body straps provided with apertures through which said bolt extends, a pair of downwardly diverging arms respectively extending from the lower ends of said body straps, cross straps connected to the ends of the said arms, downwardly converging legs connected to the ends of each of said cross straps, forward and rearward spaced essentially parallel poultry suspending bars extending between said legs and beneath said arms, the forward suspending bar being connected between the lower ends of the legs connected to the forward ends of said cross straps, the rearward suspending bar being connected between the lower ends of the legs connected to the rearward ends of said cross straps, said legs and said suspending bars defining acute angles therebetween such that the junction between said legs and said bars form the outer opposite extremities of the shackle, the space between said suspending bars being sufficiently narrow that the knee of the poultry to be suspended therefrom will not pass therebetween and sufficiently wide that the portion immediately above the knee of the poultry to be suspended theron may be received between said bars, the length of said cross straps being sufficiently long that the space between said converging legs at a portion immediately adjacent said cross bars is wider than the knee of the poultry to be suspended by said shackle.

7. A chilling shackle for suspending poultry of the type to be carried on a carrying member suspended from a mono-rail by a bolt passing horizontally through the carrying member comprising in combination, a pair of spaced vertically disposed parallel body straps provided with apertures through which said bolt extends, a pair of downwardly diverging arms respectively extending from the lower ends of said body straps, cross straps connected to the ends of said arms and extending forwardly and rearwardly, downwardly converging legs connected to the ends of each of said cross straps, forward and rearward spaced essentially parallel poultry suspending bars extending between said legs and beneath said arms, the forward suspending bar being connected between the lower ends of the legs connected to the forward ends of said cross straps, the rearward suspending bar being connected between the lower ends of the legs connected to the rearward ends of said cross straps, said legs and said suspending bars defining acute angles therebetween such that the junction between said legs and said bars form the outer opposite extremities of the shackle, and a brace joining the central portions of said suspending bars, the space between said suspending bars being sufficiently narrow that the knee of the poultry to be suspended therefrom will not pass therebetween and sufficiently wide that the portion immediately above the knee of the poultry to be suspended thereon may be received between said bars, the length of said cross straps being sufficiently long that the space between said converging legs at a portion immediately adjacent said cross bars is wider than the knee of the poultry to be suspended by said shackle, said poultry suspending bars each extending inwardly and downwardly toward their central portions.

8. A chilling shackle for suspending poultry of the type to be carried on a carrying member suspended from a mono-rail by a bolt passing horizontally through the carrying member comprising in combination, a pair of spaced vertically disposed parallel body straps provided with apertures through which said bolt extends, a connector bar at the lower extremity of said body straps for maintaining said body straps in said spaced parallel relationship, a pair of downwardly diverging arms respectively extending from the lower ends of said body straps, cross straps connected to the ends of said arms and extending forwardly and rearwardly beyond said arms, converging legs connected to the ends of each of said cross straps, forward and rearward spaced essentially parallel poultry suspending bars extending between said legs and beneath said arms, the forward suspending bar being connected between the lower ends of the legs connected to the forward ends of said cross straps, the rearward suspending bar being connected between the lower ends of the legs connected to the rearward ends of said cross straps, said legs and said suspending bars defining acute angles therebetween such that the junction between said legs and said bars form the outer opposite extremities of the shackle, said suspending bars extending inwardly and downwardly toward their central portions, and a horseshoe-shaped brace joining the central portions of said suspending bars, said horseshoe-shaped brace including an upper curved central portion defining a space larger than the space between said suspending bars and downwardly converging bars extending from said central portion of said brace and connected at their lower ends to said central portions of said suspending bars, the space between said suspending bars being sufficiently narrow that the knee of the poultry to be suspended therefrom will not pass therebetween and sufficiently wide that the portion immediately above the knee of the poultry to be suspended thereon may be received between said bars, the length of said cross straps being sufficiently long that the space between said converging legs at a portion immediately adjacent said cross bars is wider than the knee of the poultry to be suspended by said shackle and the space defined by said central portion of said brace being wider than the knee of the poultry to be suspended by said shackle.

9. A chilling shackle for suspending poultry of the type to be carried on a conveyor comprising a supporting frame, a pair of poultry suspending bars carried below said frame, said suspending bars defining an open ended channel therebetween and being uniformly spaced throughout a major portion of the length of said bars, said channel being sufficiently small that the knee joints of poultry to be suspended thereon will not pass therethrough and being sufficiently large that the smaller portion above the knee joints of the poultry will pass therethrough such that the poultry may be suspended from the shackle when the legs of the poultry are inserted within said channel, said bars being sufficiently long in said major portion that a plurality of poultry may be simultaneously suspended between said bars, a pair of downwardly converging legs respectively connected by their lower ends to said suspending bars, and means connecting the upper ends of said converging legs, the space between said converging legs intermediate the ends of said converging legs being sufficient for said knee joints to pass therethrough.

10. The structure defined in claim 9 wherein each bar includes arms which extend at an obtuse angle from its central portion.

11. The structure defined in claim 9 wherein each bar includes a pair of diverging arms extending upwardly and outwardly from its central portion.

References Cited in the file of this patent

UNITED STATES PATENTS

| | | |
|---|---|---|
| 1,561,109 | Platt et al. | Nov. 10, 1925 |
| 2,649,616 | Swanson | Aug. 25, 1953 |
| 2,685,706 | Zebarth | Aug. 10, 1954 |
| 2,879,541 | Weaver | Mar. 31, 1959 |

FOREIGN PATENTS

| | | |
|---|---|---|
| 53,574 | Netherlands | Dec. 15, 1942 |